US010353438B2

(12) United States Patent
Hernandez Santisteban et al.

(10) Patent No.: US 10,353,438 B2
(45) Date of Patent: Jul. 16, 2019

(54) VOLUME ADJUSTMENT ON HINGED MULTI-SCREEN DEVICE (71) Applicant: Microsoft Technology Licensing, LLC, Redmond, WA (US)

(72) Inventors: Adolfo Hernandez Santisteban, Bothell, WA (US); Donna Katherine Long, Redmond, WA (US); Andrew Austin Jackson, Bellevue, WA (US); Christian Michael Sadak, Seattle, WA (US); Bryant Daniel Hawthorne, Duvall, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/638,188

(22) Filed: Jun. 29, 2017

(65) Prior Publication Data
US 2018/0329461 A1 Nov. 15, 2018

Related U.S. Application Data (60) Provisional application No. 62/506,534, filed on May 15, 2017.

(51) Int. Cl.
*G06F 3/0484* (2013.01)
*G06F 3/0488* (2013.01)
(Continued)

(52) U.S. Cl.
CPC .......... *G06F 1/1681* (2013.01); *G06F 1/1616* (2013.01); *G06F 1/1618* (2013.01);
(Continued)

(58) Field of Classification Search
CPC ......... G06F 1/1647–165; G06F 1/1618; G06F 3/0488; G06F 3/04847
See application file for complete search history.

(56) References Cited

U.S. PATENT DOCUMENTS 8,631,327 B2 1/2014 Sugiyama et al.
9,678,571 B1 * 6/2017 Robert .................... G06F 3/016
(Continued)

FOREIGN PATENT DOCUMENTS

EP 2759919 A2 7/2014
EP 2942942 A1 11/2015
WO 2011075114 A1 6/2011

OTHER PUBLICATIONS

"Dual Monitor Setup, automatic audio output switch how to", http://www.tomshardware.com/forum/9044-63-dual-monitor-setup-automatic-audio-output-switch, Published on: Jul. 25, 2010, 6 pages.
(Continued)

*Primary Examiner* — Michael Pervan
(74) *Attorney, Agent, or Firm* — Alleman Hall Creasman & Tuttle LLP (57) ABSTRACT A hinged multi-screen computing device is provided that includes a processor, at least one speaker, two display devices connected by a hinge containing a hinge sensor, and a housing with two parts, each including a display device. At least one of the displays is configured to display GUI controls, one which adjusts a volume balance between a first and second GUI element displayed on each of the first and second displays, and another which adjusts overall volume.

16 Claims, 9 Drawing Sheets

(51) Int. Cl.
  *G06F 1/16* (2006.01)
  *G06F 3/041* (2006.01)
  *G06F 3/044* (2006.01)
  *G06F 3/0481* (2013.01)
  *G06F 3/16* (2006.01)

(52) U.S. Cl.
  CPC .......... *G06F 1/1643* (2013.01); *G06F 1/1677* (2013.01); *G06F 3/044* (2013.01); *G06F 3/0412* (2013.01); *G06F 3/0488* (2013.01); *G06F 3/04817* (2013.01); *G06F 3/04847* (2013.01); *G06F 3/04883* (2013.01); *G06F 3/165* (2013.01); *G06F 1/1692* (2013.01); *G06F 2203/0381* (2013.01); *G06F 2203/04803* (2013.01)

(56) References Cited

U.S. PATENT DOCUMENTS

| | | | |
|---|---|---|---|
| 2007/0211023 A1* | 9/2007 | Boillot | G06F 3/017 345/156 |
| 2008/0002831 A1 | 1/2008 | Donaldson et al. | |
| 2012/0105734 A1 | 5/2012 | Johnson et al. | |
| 2014/0210740 A1* | 7/2014 | Lee | G06F 3/0488 345/173 |
| 2016/0041806 A1* | 2/2016 | Laaksonen | G06F 3/16 700/94 |
| 2016/0266867 A1 | 9/2016 | Olesh et al. | |
| 2017/0075640 A1 | 3/2017 | Chun et al. | |

OTHER PUBLICATIONS

Elise, "How to change the volume of an audio group", https://support.google.com/chromecast/answer/6328714?hl=en, Retrieved on: May 16, 2017, 3 pages.

"Windows 7: How to auto-change audio balance with multiple screens", https://www.sevenforums.com/sound-audio/262955-how-auto-change-audio-balance-multiple-screens.html, Published on: Nov. 6, 2012, 3 pages.

"International Search Report and Written Opinion Issued in PCT Application No. PCT/US18/028735", dated Jul. 11, 2018, 13 Pages.

\* cited by examiner

VOLUME ADJUSTMENT ON HINGED MULTI-SCREEN DEVICE

CROSS REFERENCE TO RELATED APPLICATIONS

This application claims priority to U.S. Provisional Patent Application No. 62/506,534, filed on May 15, 2017, the entirety of which is hereby incorporated herein by reference.

BACKGROUND

Users interact with multi-screen mobile devices throughout a variety of positions, including holding the device vertically, holding the device with a primary screen facing toward the user, holding the screen with a second screen facing toward the user, and other positions and orientations. When viewing content on the screens in these varying positions, users may encounter challenges adjusting the audio volumes of different applications executed on each of the screens, or different audio-enabled graphical user elements displayed on each of the screens.

SUMMARY

To address the above issues, a mobile computing device is provided. The mobile computing device may include a housing having a first part and a second part, the first part including a first display, and the second part including a second display, the housing including at least one speaker mounted in the first part or the second part. The mobile computing device may further include a processor mounted in the housing and operatively coupled to the speaker and first and second displays. The first display may be configured to display a graphical user interface element having an associated first audio stream. The second display may be configured to display a second graphical user interface element having an associated second audio stream. At least one of the first and second displays may be configured to display a first graphical user interface control configured to receive a user input of a volume balance setting to adjust a volume balance between a first application displayed on the first display and a second application displayed on the second display. At least one of the first and second displays may be configured to display a second graphical user interface control configured to receive a user input of an overall volume setting to adjust an overall volume of the first audio stream and the second audio stream. The processor may be configured to play the first and second audio streams out of the speaker based on the volume balance setting and the overall volume setting.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As discussed above, conventional methods for volume adjustment of multiple applications or other content displayed on different screens of a multi-screen mobile computing device may be cumbersome and inconvenient for users of such mobile computing devices. The systems and methods described herein have been devised to address these challenges.

Figure 1:
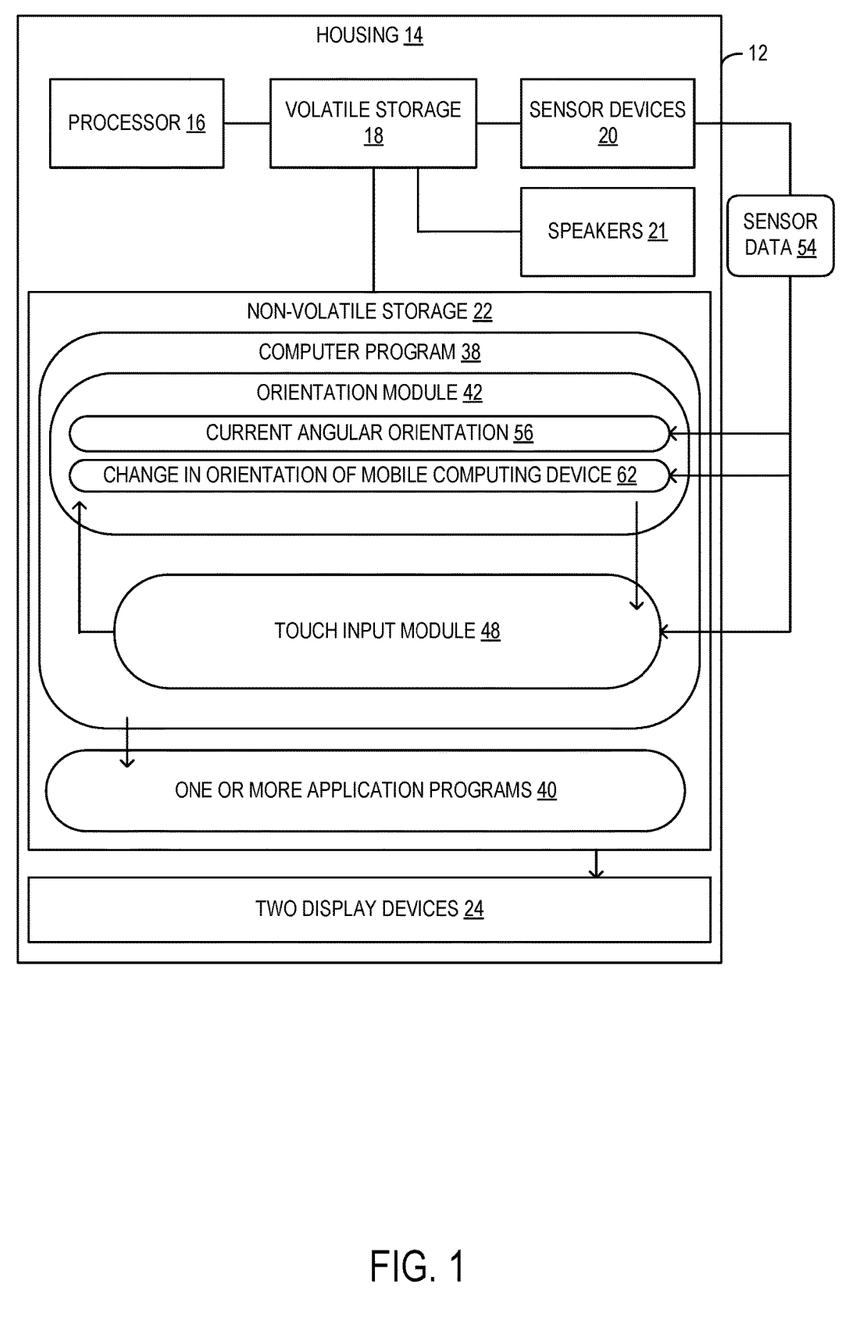
FIG. 1 shows an example mobile computing device of the present description.

FIG. 1 illustrates a mobile computing device 12 that includes a housing 14, which, for example, may take the form of a casing surrounding internal electronics and providing structure for displays, sensors, speakers, buttons, etc. The housing 14 is configured to include a processor 16, volatile storage device 18, sensor devices 20, non-volatile storage device 22, one or more speakers 21, and at least two display devices 24.

The mobile computing device 12 may, for example, take the form of a smart phone device. In another example, the mobile computing device 12 may take other suitable forms, such as a tablet computing device, a wrist mounted computing device, etc.

Figures 2A, 2B:
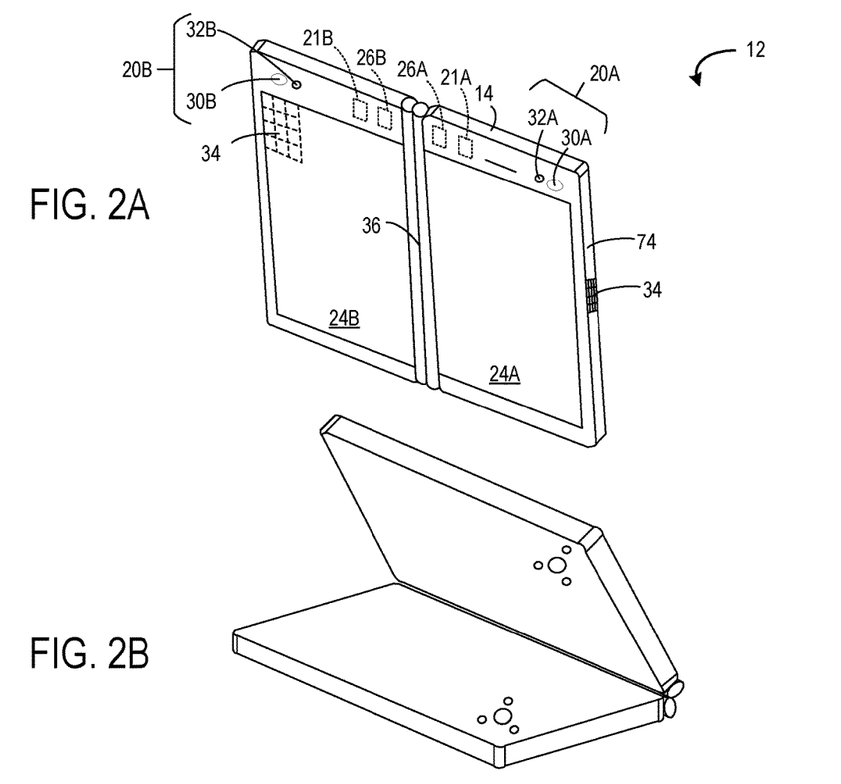
FIG. 2A shows an example of two display screens arranged in a side-by-side orientation for the mobile computing device of FIG. 1.
FIG. 2B shows an example of two display screens arranged in a reflex orientation for the mobile computing device of FIG. 1.

Turning to FIG. 2A, an example mobile computing device 12 is illustrated. As shown, the example mobile computing device 12 includes a housing 14. As discussed above, the housing 14 may be configured to internally house various electronic components of the example mobile computing device 12, including the processor 16, volatile storage device 18, and non-volatile storage device 22. Additionally, the housing 14 may provide structural support for the display devices 24, speakers 21, and the sensor devices 20. The sensor devices 20 may include a plurality of different sensors, such as, for example, inertial measurement units 26A and 26B, forward facing cameras 30A and 30B, depth cameras 32A and 32B, etc. The cameras are not particularly limited and may comprise a time of flight (TOF) three-dimensional camera, a stereoscopic camera, and/or picture cameras. The inertial measurement units 26A and 26B may include accelerometers, gyroscopes, and possibly magno-meters configured to measure the position of the mobile computing device 12 in six degrees of freedom, namely x, y, z, pitch, roll and yaw, as well as accelerations and rotational velocities, so as to track the rotational and translational motion of the mobile computing device 12. The sensor devices 20 may also include a capacitive touch sensor 34, such as a capacitive array that is integrated with each of the two or more display devices 24. In another example, the sensor devices 20 may include camera-in-pixel sensors that are integrated with each of the two or more display devices 24. It will be appreciated that the examples listed above are exemplary, and that other types of sensors not specifically mentioned above may also be included in the sensor devices 20 of the mobile computing device 12. In the illustrated example, the sensor devices 20 include two or more inertial measurement units 26A and 26B that are contained by the housing 14. The sensor devices 20 may further include forward facing cameras 30A and 30B. In one example, the forward facing cameras 30A and 30B include RGB cameras. However, it will be appreciated that other types of cameras may also be included in the forward facing cameras 30A and 30B. In this example, forward facing is a direction of the camera's associated display device. Thus, in the example of FIG. 2A, as the screens for both of an example pair of display devices 24A and 24B are facing the same direction, both of the forward facing cameras 30A and 30B are also facing the same direction. The sensor devices 20 further include depth cameras 32A and 32B.

As shown, the sensor devices 20 may also include capacitive touch sensors 34 that are integrated with the pair of display devices 24A and 24B. Although a pair of displays is illustrated, a larger number of displays may be hingedly linked together. In the illustrated embodiment, the capacitive touch sensors 34 include a capacitive grid configured to sense changes in capacitance caused by objects on or near the display devices, such as a user's finger, hand, stylus, etc. In one embodiment, the capacitive touch sensors 34 may also be included on one or more sides of the mobile computing device 12. For example, the capacitive touch sensors 34 may be additionally integrated into the sides of the housing 14 of the mobile computing device 12. While the capacitive touch sensors 34 are illustrated in a capacitive grid configuration, it will be appreciated that other types of capacitive touch sensors and configurations may also be used, such as, for example, a capacitive diamond configuration. In other examples, the sensor devices 20 may include camera-in-pixel devices integrated with each display device including the pair of display devices 24A and 24B. It will be appreciated that the sensor devices 20 may include other sensors not illustrated in FIG. 2A.

In the example mobile computing device 12 illustrated in FIG. 2A, the two example display devices 24A and 24B are movable relative to each other. As shown, the example mobile computing device 12 includes a housing 14 including the processor 16, the inertial measurement units 26A and 26B, and the two or more display devices 24, the housing including a hinge 36 between a pair of display devices 24A and 24B of the two or more display devices 24, the hinge 36 being configured to permit the pair of display devices 24A and 24B to rotate between angular orientations from a face-to-face angular orientation to a back-to-back angular orientation. Likewise, the housing includes a hinge 36 between a pair of speakers 21A and 21B, the hinge 36 being configured to permit the pair of speakers 21A and 21B to rotate between angular rotations from face-to-face angular orientation to a back-to-back angular orientation. The speakers 21A and 21B convert electrical signals to human-audible sound waves via audio circuitry that converts received electrical signals into audio data. It will be appreciated that each of the speakers 21A and 21B may comprise one speaker or a plurality of speakers that function together as a unit.

Now turning to FIG. 2B, the hinge 36 permits the pair of display devices 24A and 24B to rotate relative to one another such that an angle between the pair of display devices 24A and 24B can be decreased or increased by the user via applying suitable force to the housing 14 of the mobile computing device 12. As shown in FIG. 2B, the pair of display devices 24A and 24B may be rotated until the pair of display devices 24A and 24B reach a back-to-back angular orientation as shown in FIG. 2C.

Figures 2C, 2D:
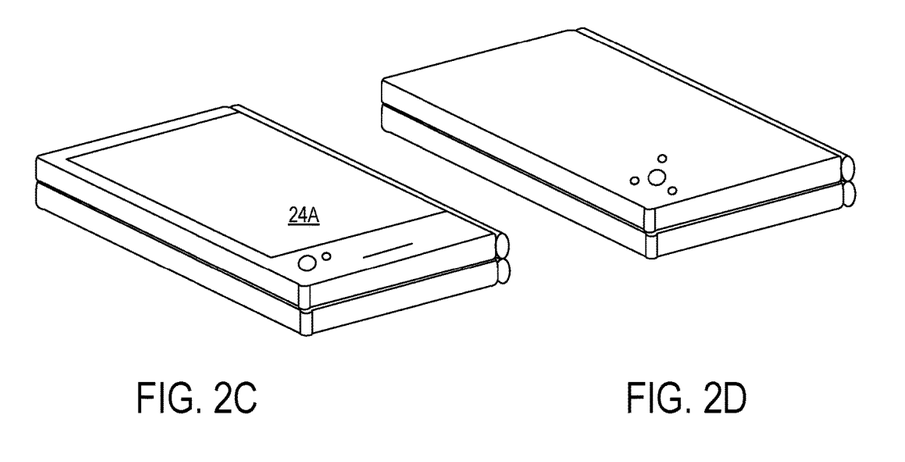
FIG. 2C shows an example of two display screens arranged in a back-to-back orientation for the mobile computing device of FIG. 1.
FIG. 2D shows an example of two display screens arranged in a front-to-front orientation for the mobile computing device of FIG. 1.

As illustrated in FIG. 2C, while in an angular orientation where the pair of display devices 24A and 24B are in a back-to-back angular orientation, the pair of display devices 24A and 24B face away from each other. Thus, while using the mobile computing device 12, the user may only be able to view one of the display devices of the pair of display devices 24A and 24B at a time. Additionally, while in a back-to-back angular orientation, sensor packages 20A and 20B of the sensor devices 20, which may each include forward facing cameras 30A and 30B, and depth cameras 32A and 32B, also face in the same direction as their respective display device, and thus also face away from each other.

As shown in FIG. 2D, the angular orientation between the pair of display devices 24A and 24B may also rotate to a face-to-face orientation where the pair of display devices face each other. Such an angular orientation may help protect the screens of the display devices.

In one implementation, the face-to-face angular orientation is defined to have an angular displacement as measured from display to display of between 0-90 degrees, an open angular orientation is defined to be between 90-270 degrees, and a back-to-back orientation is defined to be from 270-360 degrees. Alternatively, an implementation in which the open orientation is not used to trigger behavior may be provided, and in this implementation, the face-to-face angular orientation may be defined to be between 0 and 180 degrees and the back-to-back angular orientation may be defined to be between 180 and 360 degrees. In either of these implementations, when tighter ranges are desired, the face-to-face angular orientation may be defined to be between 0 and 60 degrees, or more narrowly to be between 0 and 30 degrees, and the back-to-back angular orientation may be defined to be between 300 and 360 degrees, or more narrowly to be between 330 and 360 degrees. The zero degree position may be referred to as fully closed in the fully face-to-face angular orientation and the 360 degree position may be referred to as fully open in the back-to-back angular orientation. In implementations that do not use a double hinge and which are not able to rotate a full 360 degrees, fully open and/or fully closed may be greater than zero degrees and less than 360 degrees.

Turning back to FIG. 1, the processor 16 is configured to execute a computer program 38, which, for example, may be an operating system or control program for the mobile computing device, and one or more application programs 40 stored on the non-volatile storage device 22, and to enact various control processes described herein. In some examples, the processor 16, volatile storage device 18, and non-volatile storage device 22 are included in a System-On-Chip configuration.

The computer program 38 executed by the processor 16 includes an orientation module 42, and a touch input module 48. The touch input module is configured to process touch inputs, which may be inputs from a digit of a user or from a stylus. As shown in FIG. 1, the orientation module 42 is configured to receive sensor data 54 from the sensor devices 20. Based on the sensor data 54, the orientation module 42 is configured to detect a current angular orientation 56 between the pair of display devices 24A and 24B indicating that the pair of display devices 24A and 24B are facing away from each other. As discussed previously, the angular orientation between the pair of display devices 24A and 24B may rotate through angular orientations between a face-to-face angular orientation to a back-to-back angular orientation. Thus, the orientation module 42 is configured to detect a current angular orientation 56 indicating that the pair of display devices 24A and 24B are facing away from each other, such as a back-to-back angular orientation.

The orientation module 42 may be configured to detect the current angular orientation 56 based on different types of sensor data. In one embodiment, the sensor data 54 may include inertial measurement unit data received via the inertial measurement units 26A and 26B. As the user applies force to the housing 14 of the mobile computing device 12 to rotate the pair of display devices 24A and 24B, the inertial measurement units 26A and 26B will detect the resulting movement. Thus, based on inertial measurement unit data for a new rotation and a previously known angular orientation between the pair of the display devices 24A and 24B, the orientation module 42 may calculate a new current angular orientation 56 resulting after the user rotates the pair of display devices 24A and 24B. However, it will be appreciated that the current angular orientation 56 may also be calculated via other suitable methods. For example, the sensor devices 20 may further include a hinge sensor in the hinge 36 that is configured to detect an angular orientation of the hinge 36, and thereby detect a current angular orientation of the pair of display devices 24A and 24B around the pivot which is the hinge 36. In this embodiment, the hinge sensor is incorporated within the hinge 36 itself. However, it will be appreciated that the hinge sensor may alternatively be provided outside of the hinge 36.

Figure 3:
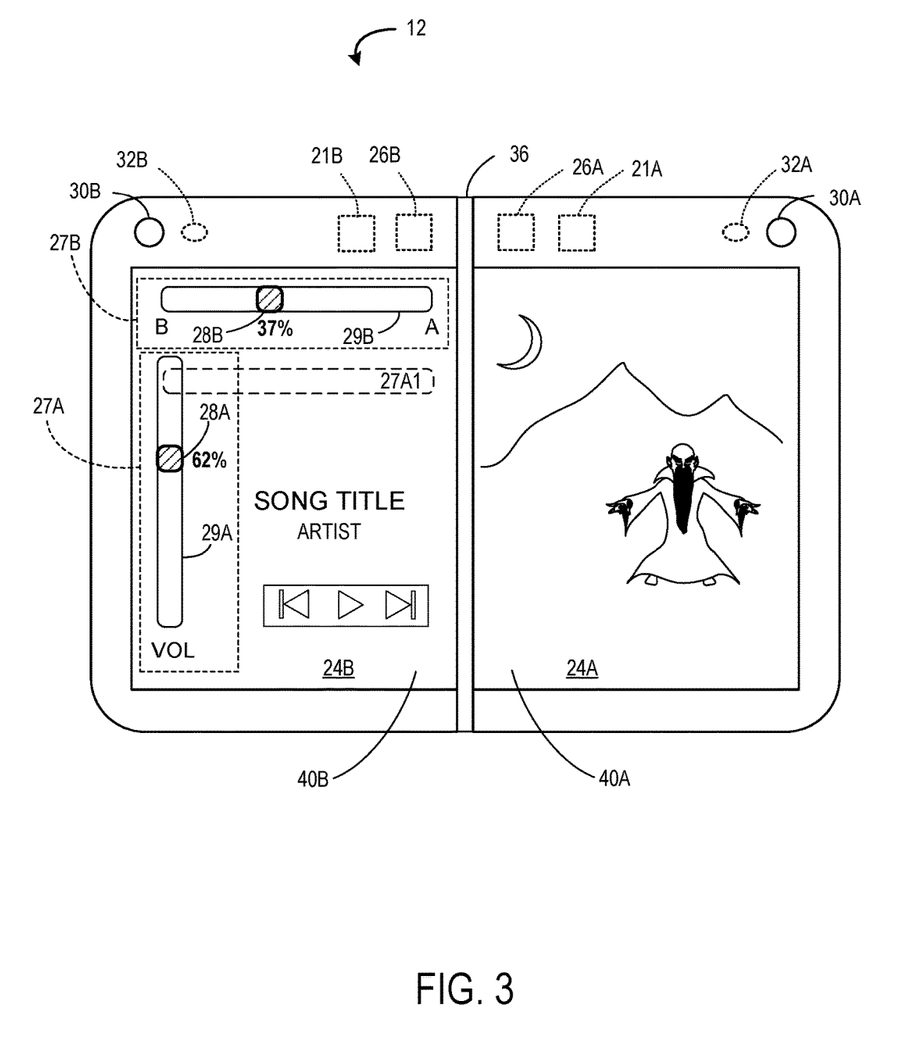
FIG. 3 shows a first example implementation of GUI controls for adjusting audio parameters of the mobile computing device of FIG. 1.

With reference to FIG. 3, an example use illustrating aspects of the present disclosure will now be presented. As shown in FIG. 3, a user may be interacting with two different applications on the multi-screen computing device 12. In this example, a music application 40B is being displayed on the left display device 24B, while a game application 40A is being displayed on the right display device 24A. A first graphical user interface (GUI) control 27A and a second GUI control 27B are displayed on the left display device 24B. However, it will be appreciated that the placement of the GUI controls 27A and 27B on the display devices 24A and 24B is not particularly limited, and the two user interface controls 27A and 27B may be placed independently at various locations on the display devices 24A and 24B in any orientation (vertical or horizontal, parallel or perpendicular to each other, sized to overlap both display devices). GUI control 27A1 is illustrated in a parallel orientation with GUI control 27B.

In this implementation, each GUI control 27A and 27B is displayed as a slider control on either or both of the display devices 24A and 24B by a computer program 38 (see FIG. 1). The GUI control 27A is manipulated by a user to adjust an overall volume of both an audio stream of the application 40B executed on the left display device 24B (hereinafter referred to as the left application 40B) and an audio stream of the application 40A executed on the right display device 24A (hereinafter referred to as the right application 40A). A user adjusts the first GUI control 27A by manipulating the handle 28A and sliding it upward or downward (i.e. utilizing a drag motion), so that the program 38 adjusts the volumes of the audio outputted by both the left application 40B and the right application 40A so that the user perceives the volumes of the audio output of both speakers 21A and 21B as increasing or decreasing in tandem with equal magnitude.

The second GUI control 27B is manipulated by the user to adjust volume balance between an audio stream of the left application 40B and an audio stream of the right application 40A. The user adjusts the second GUI control 27B by manipulating the handle 28B and sliding it to the left or right (i.e. utilizing a drag motion), thereby altering the volume balance of the two applications 40A, 40B to achieve a desired sound mix. For example, if the handle 28B is actuated to be closer to the left end of the second control bar 29B than the right end, then the left application 40B outputs audio at a volume that is perceived by the user to be at a correspondingly higher decibel level than the volume of the audio outputted by the right application 40A. Conversely, if the GUI control 27B is actuated by a user providing a user input to handle 28B and sliding the handle 28B toward the right (A) side in FIG. 3, the system will cause the right application 40A to output audio at a volume that is perceived by the user to be at a correspondingly higher decibel level than the volume of the audio outputted by the left application 40B. Typically, the audio is mixed into a stereo signal and emitted from speakers 21A, 21B as stereo audio. Alternatively, the audio stream may be mixed to a monoaural signal to be emitted from both speakers 21A, 21B, and in yet another implementation, the application 40A may play out its audio stream from speaker 21A and application 40B may play out its audio stream from speaker 21B. In the latter implementation, the user may alternatively configure application 40B to play out its audio stream from speaker 21A and application 40A may play out its audio stream from speaker 21B. Further, it will be appreciated that instead of different applications 40A, 40B, different graphical user interface elements of the same application, each having an associated audio stream, may be similarly displayed on each of displays 24A, 24B and the audio stream of each graphical user interface element controlled using the methods described herein.

If the user slides the handle 28B all the way to the right of the control bar 29B, the volume of the audio stream outputted by the left application 40B may be reduced to zero or a residual volume, while the volume of the audio stream outputted by the right application 40A may remain audible. Conversely, if the user slides the handle 28B all the way to the left of the control bar 29B, the volume of the audio stream from the right application 40A may be reduced to zero or a residual volume, while the volume of the audio stream outputted by the left application 40B may remain audible. It will be appreciated that in some implementations, the audio stream of the left application 40B may be a foreground audio stream and the audio stream of the right application 40A may be a background audio stream, or vice versa. Alternatively, the background audio stream may be one or a plurality of background audio streams. In other possible implementations, the background audio stream may not be associated with a specific application or a specific display.

Figure 4:
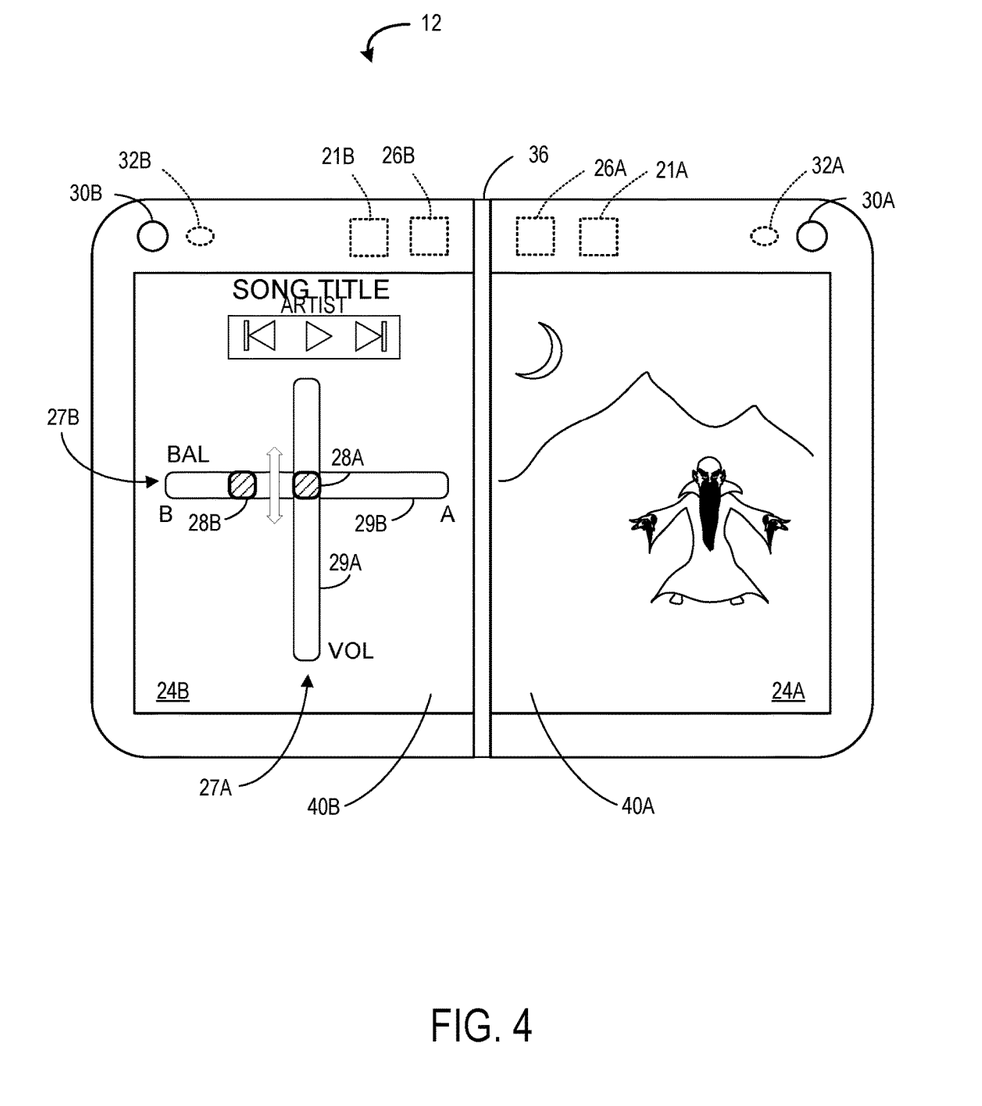
FIG. 4 shows a second example implementation of GUI controls for adjusting audio parameters of the mobile computing device of FIG. 1.

FIG. 4 shows another implementation in which the GUI control 27A and GUI control 27B overlap when displayed. In this implementation, the user may slide the handle 28B up and down to adjust the overall volume setting, and the GUI control 27A will follow the movement of the handle 28B so that handle 28A and control bar 29B move up and down with the vertical location of the handle 28B. Once the user has set the desired overall volume setting, the user may move his digit or stylus left or right to adjust the balance setting. In this way, the first GUI control 27A and second GUI control 27B are configured to be actuated via a single continuous user input, if desired. Alternatively, the user may lift a digit or stylus during operation of one of the GUI controls 27A, 27B, and touch or contact back down to adjust the other of the GUI controls.

Figure 5:
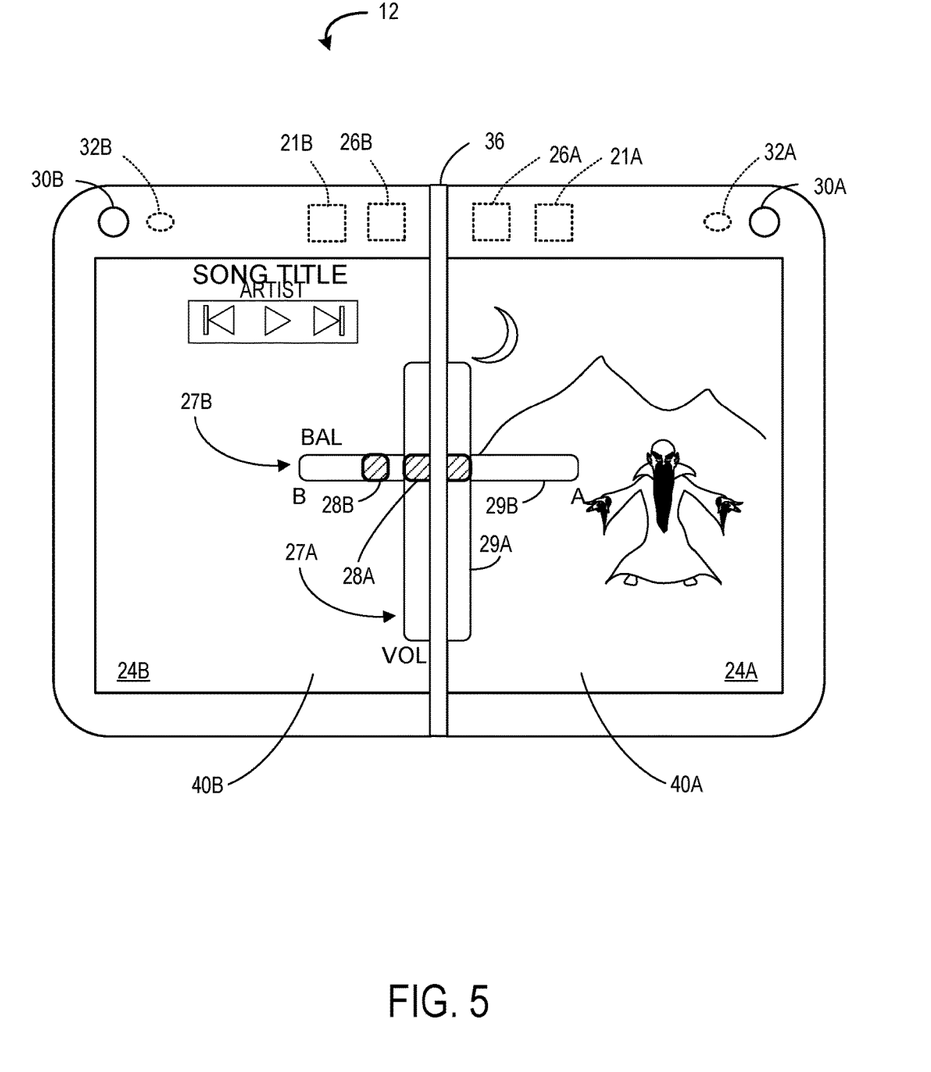
FIG. 5 shows a third example implementation of GUI controls for adjusting audio parameters of the mobile computing device of FIG. 1.

Turning now to FIG. 5, in this implementation one of the GUI controls (in this case 27A) is positioned to extend across the hinge location, so that it is displayed partially on the first display 24A and partially on the second display 24B. With this placement, the GUI control 27A is actuatable by a user input to either the first display 24A or second display 24B. One potential advantage of such a configuration is that the user is provided with a haptic feedback at the mid point of the GUI control 27B, and also enables a user to physically contact the left (or right) display when setting the balance setting to increase the signal for the audio stream coming from the application or GUI element on the left (or right) display, thereby reinforcing to the user which display will have its audio volume increased.

Figure 6:
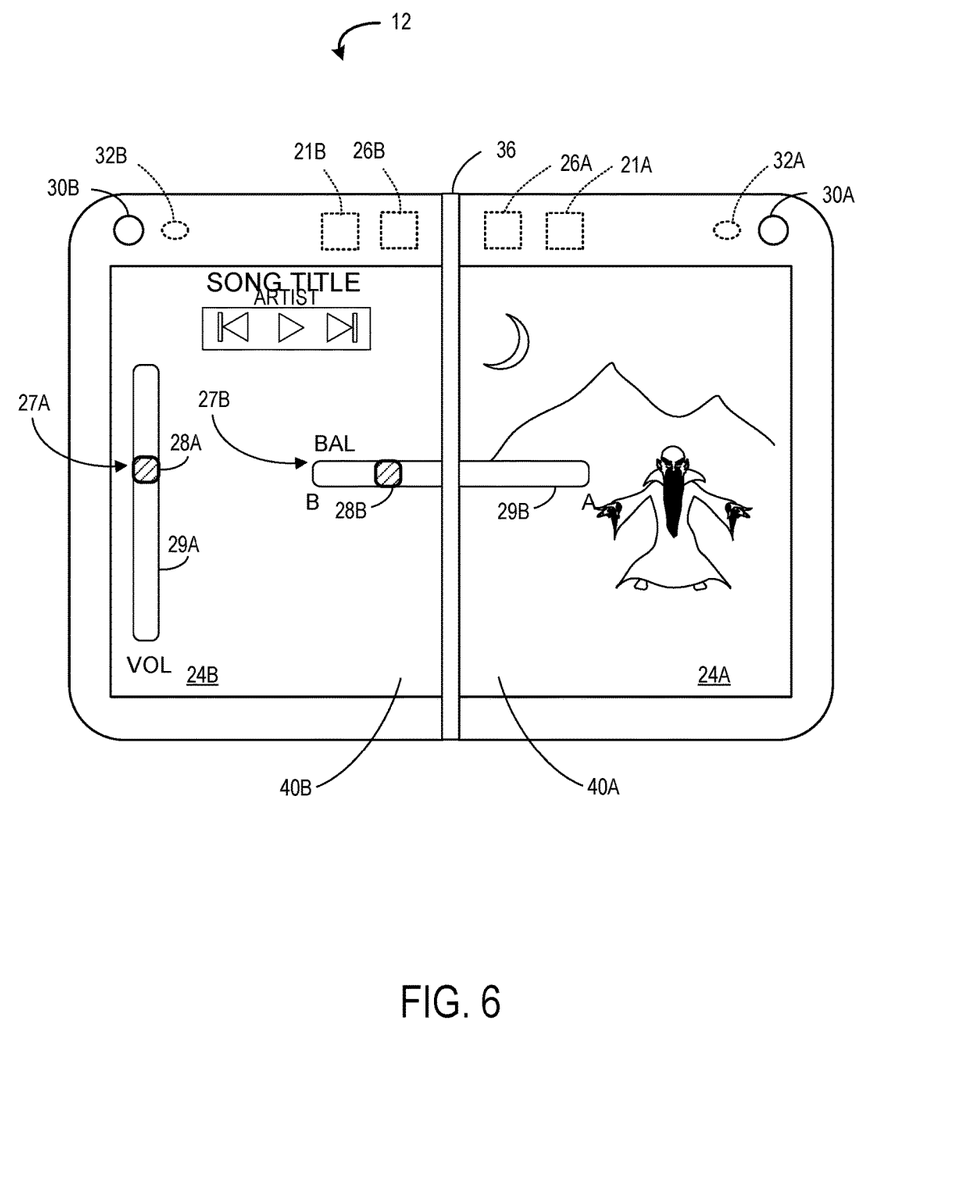
FIG. 6 shows a fourth example implementation of GUI controls for adjusting audio parameters of the mobile computing device of FIG. 1.

FIG. 6 illustrates another implementation in which one of the GUI controls (in this case 27B) is positioned to be partially displayed on each display 24A, 24B, and the other GUI control (in this case 27A) is positioned to be entirely positioned on one of the displays (in this case 24B). The potential advantage of this configuration is that the volume control, which applies to the overall volume, is not straddling the hinge, and so may be easier for a user to operate, while the balance control does extend to each display, which provides positive feedback to the user as to which display audio will be increased.

Figure 7:
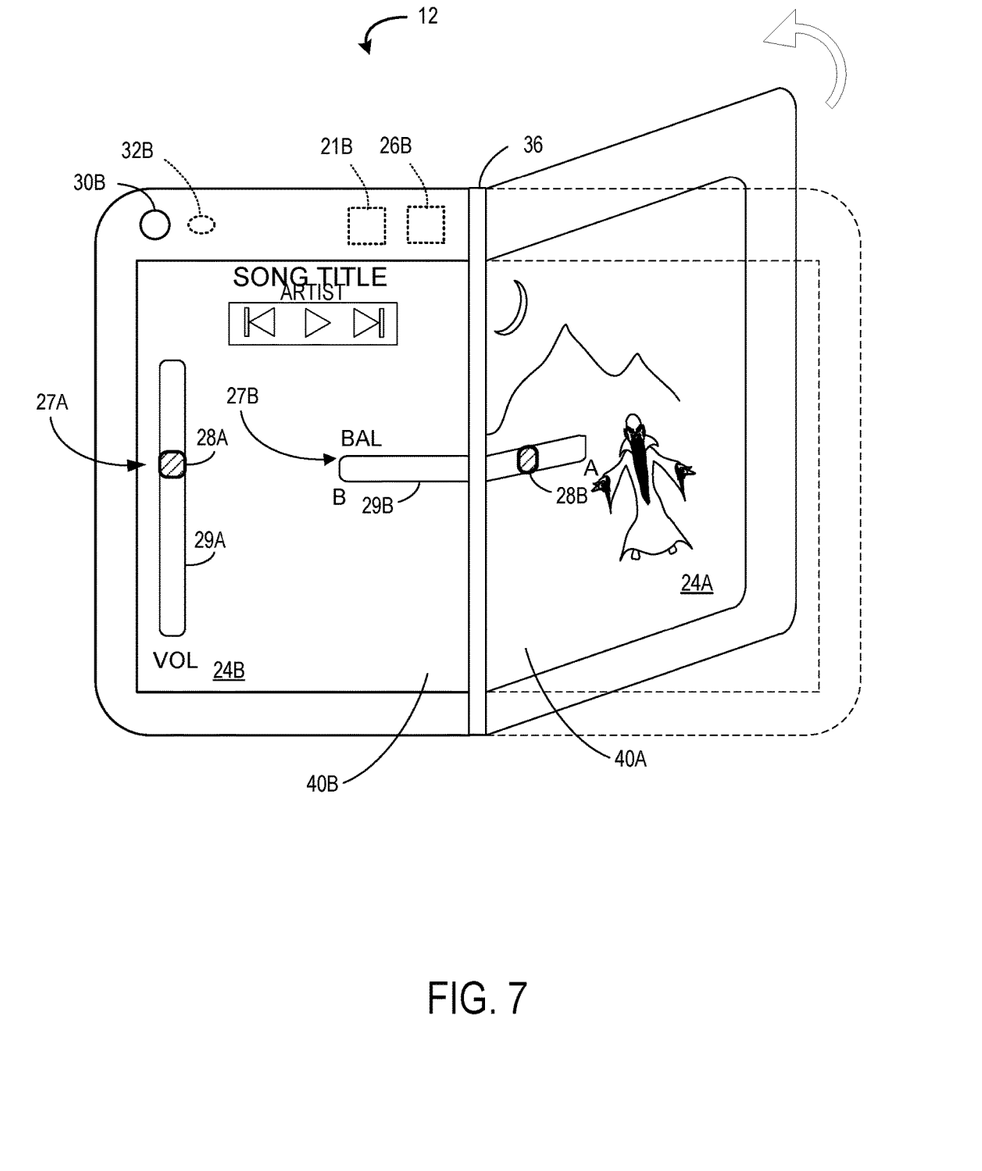
FIG. 7 shows a fifth example implementation of GUI controls for adjusting audio parameters of the mobile computing device of FIG. 1.

FIG. 7 illustrates an implementation similar to FIG. 6, but in which the relative angular displacement as measured by the hinge angle sensor is used as user input to control the one of the GUI controls. In the depicted implementation, the hinge angle is used to control the GUI control 27B that straddles the hinge 36 and that is partially displayed on each of the displays 24A, 24B. For example, when the hinge angle is 180 degrees, the GUI control 27B may be set to its midpoint, with 50%-50% mix of audio from application 40A and 40B. As the user closes the device by raising the display 24A, the hinge angle narrows, and the IMU measurements can be used to determine that the user has raised the right hand side, i.e., display 40A. Accordingly, the slider can be programmatically (i.e., not in response to user input from the user on the GUI control 27B) slid to the right to increase the proportion of audio from the application 40A on display 24A. Alternatively, the device could be configured such that 180 degrees represents a midpoint (50%-50% mix) of the slider, and the user could open the device further to a hinge angle greater than 180 degrees to slide the slider the right and increase the proportion of audio from application 40A, and could close the device to narrow the hinge angle to less than 180 degrees and decrease the proportion of audio from application 40B and increase the proportion from application 40B.

Although described herein as a balance control, it will be appreciated that in some implementations GUI control 27B more precisely is referred to as cross-fader configured to fade in audio from the first audio stream from the first application 40A or first GUI element displayed on the first display from a level of 0-100% across its control surface, and is configured to fade out audio from the second audio stream from the second audio application 40B when actuated in the same direction from 100-0%, with a mix of 50%-50% of the two audio streams at the midpoint of the control range.

Figure 8:
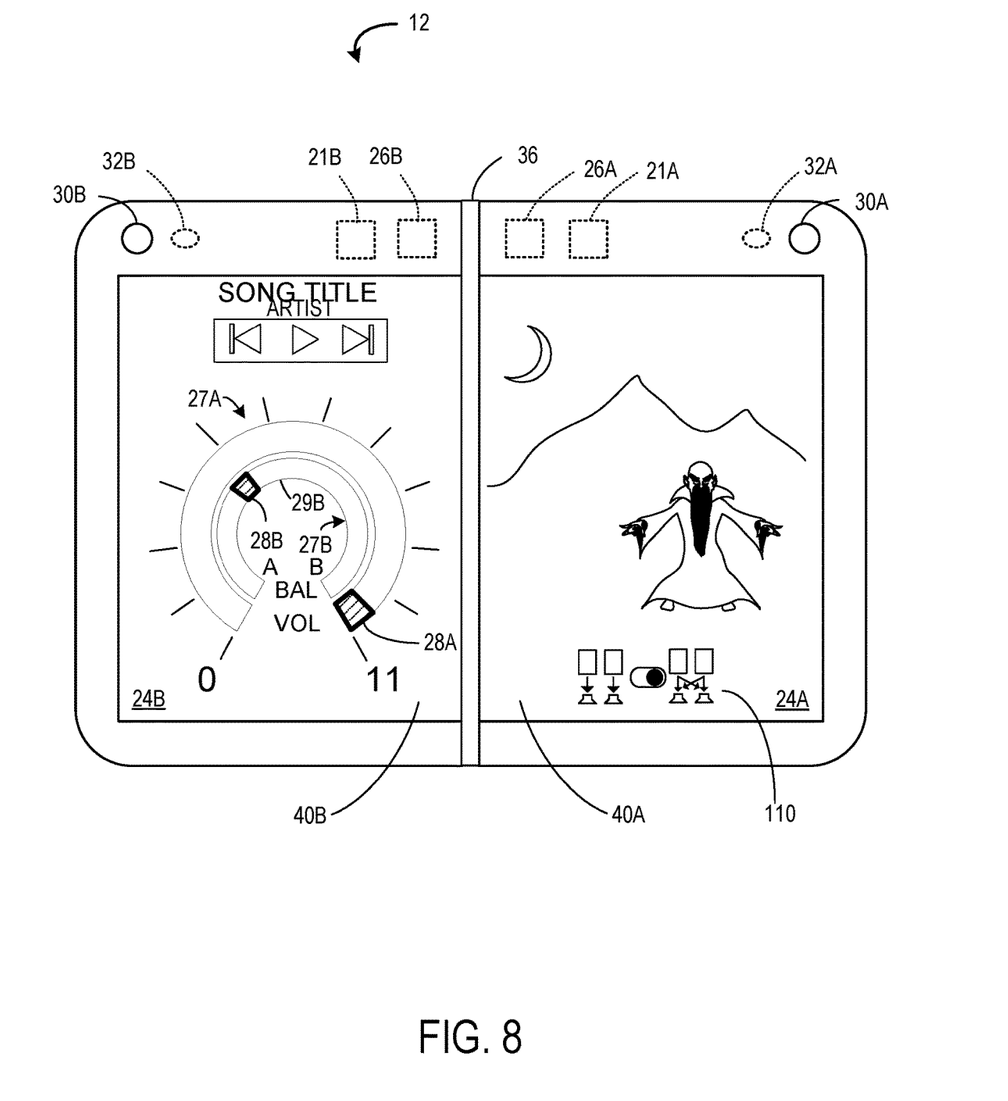
FIG. 8 shows a sixth example implementation of GUI controls for adjusting audio parameters of the mobile computing device of FIG. 1.

FIG. 8 illustrates an implementation in which the GUI controls 27A, 27B are formed in a nested, semi-circular configuration. The user can provide user inputs to handles 28A, 28B to dial in the appropriate balance setting and overall volume setting for the audio. On the first display 24A an audio mix control 110 is displayed. The audio mix control is configured to receive a user input selecting between a parallel output mode and a mixed output mode, and adjust a program setting to specify one of the modes. In the parallel output mode, an audio stream from a graphical user interface element from application 40A (or a common application) displayed on the first display 24A is played back via first speaker 21A positioned in the first part of the housing which houses the first display 24A, and an audio stream from a graphical user interface element of application 40B (or the common application) displayed on the second display 24B is played back via speaker 21B positioned in the second part of the housing which houses the second display 24B. In the mixed output mode, the audio output from the graphical user interface elements of applications 40A, 40B (or a common application) displayed on both displays 24A, 24B are mixed and output as a mixed mono or stereo played back through both speakers 21A, 21B. The icon on the left side of the button selector indicates the mixed audio mode and the icon on the right side of the button selector of the audio mix control 110 indicates the parallel output mode. Thus, the mixed audio mode is shown as being selected.

Although in the above implementations a single processor 16 is provided to execute computing program 38 to control the audio processing, it will be appreciated that the first part and the second part of the mobile computing device 12 may include separate processors. When separate processors are provided, application 40A may be executed on a processor of the first part and application 40B may be executed on a processor of the second part. In this implementation, in the parallel output mode, the audio stream from application 40A is generated by the processor associated with the first part of the housing and output on the first speaker mounted in the first part of the housing. Likewise, the audio stream from application 40B is generated by the processor in the second part of the housing and output on the second speaker mounting in the second part of the housing.

Further, although the above implementations have been described as outputting audio to a first speaker and a second speaker, it will be appreciated that the implementations also may be used with headphones. In this case, the parallel output mode and mixed output mode audio may be outputted to a user's headphones via a wireless connection or a headphone jack provided in either of the first or second parts of the housing. In the parallel output mode, the left channel may reproduce the left display audio and the right channel may reproduce the right display audio. In the mixed audio output mode, the audio from each display may be played over both channels, according to the volume balance setting and overall volume setting.

In at least one configuration, the user may also tap a control bar (e.g. the first control bar 29A or the second control bar 29B) so that the handle immediately moves to that location. Each handle 28A, 28B may include a numerical label that provides an indication of the relative location of that handle on the slider control bar. It will be appreciated that a handle refers to a pre-defined region of the GUI controls 27A, 27B on the display devices 24A and 24B that is grabbable by a user to adjust the value of the GUI control. Further, it will be appreciated that GUI controls 27A, 27B are illustrated as sliders, but alternatively may take the form of virtual knobs, text input boxes, or other control by which a user may adjust a parameter such as the balance and volume settings discussed herein.

In summary, two GUI controls are provided on displays of a multi-screen device to conveniently control the audio volume of two applications or other GUI elements concurrently displayed on two different displays at the same time. User input to control the GUI controls may be in the form of touch inputs (via a digit, mouse, or stylus) on the touch-sensitive displays, or may be in the form of a hinge angle adjustment in some implementations.

Figure 9:
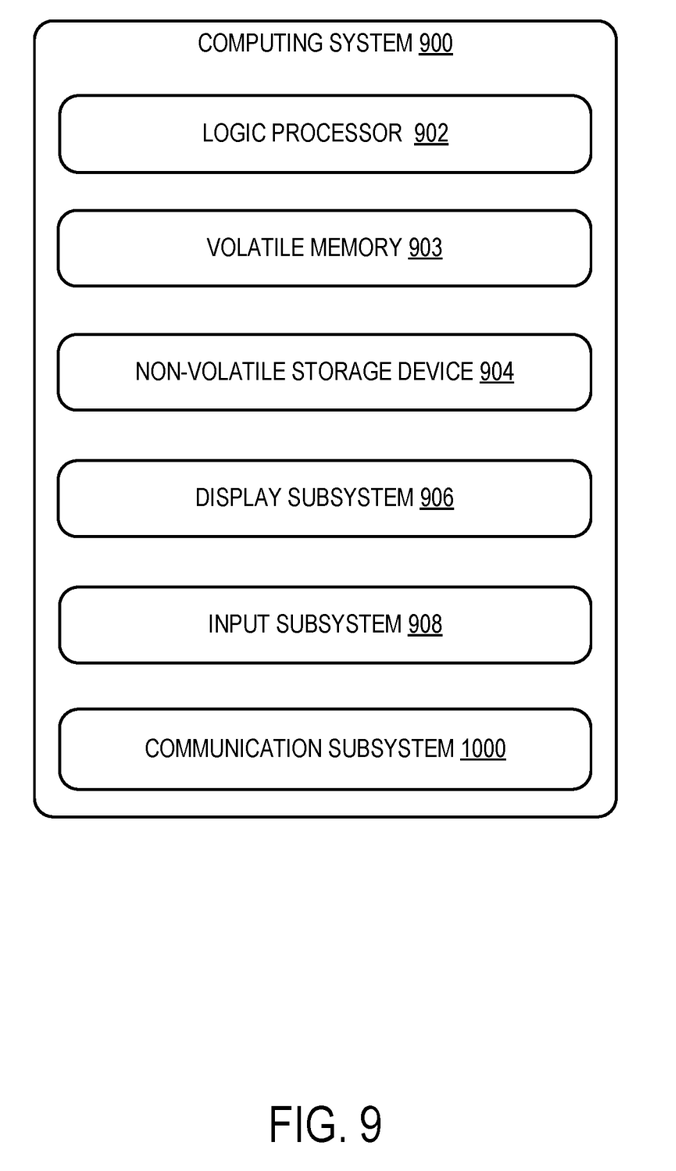
FIG. 9 shows an example computing system according to an embodiment of the present description.

FIG. 9 schematically shows a non-limiting embodiment of a computing system 900 that can enact one or more of the methods and processes described above. Computing system 900 is shown in simplified form. Computing system 900 may embody the mobile computing device 12 of FIG. 1. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 903, and a non-volatile storage device 904. Computing system 900 may optionally include a display subsystem 906, input subsystem 908, communication subsystem 1000, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 904 includes one or more physical devices configured to hold instructions executable by the logic processors to implement the methods and processes described herein. When such methods and processes are implemented, the state of non-volatile storage device 904 may be transformed—e.g., to hold different data.

Non-volatile storage device 904 may include physical devices that are removable and/or built-in. Non-volatile storage device 904 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 904 may include nonvolatile, dynamic, static, read/write, read-only, sequential-access, location-addressable, file-addressable, and/or content-addressable devices. It will be appreciated that non-volatile storage device 904 is configured to hold instructions even when power is cut to the non-volatile storage device 904.

Volatile memory 903 may include physical devices that include random access memory. Volatile memory 903 is typically utilized by logic processor 902 to temporarily store information during processing of software instructions. It will be appreciated that volatile memory 903 typically does not continue to store instructions when power is cut to the volatile memory 903.

Aspects of logic processor 902, volatile memory 903, and non-volatile storage device 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 904, using portions of volatile memory 903. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 906 may be used to present a visual representation of data held by non-volatile storage device 904. The visual representation may take the form of a graphical user interface (GUI). As the herein described methods and processes change the data held by the non-volatile storage device, and thus transform the state of the non-volatile storage device, the state of display subsystem 906 may likewise be transformed to visually represent changes in the underlying data. Display subsystem 906 may include one or more display devices utilizing virtually any type of technology. Such display devices may be combined with logic processor 902, volatile memory 903, and/or non-volatile storage device 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, inertial measurement unit, and/or gyroscope for motion detection and/or intent recognition; as well as electric-field sensing componentry for assessing brain activity; and/or any other suitable sensor.

When included, communication subsystem 1000 may be configured to communicatively couple various computing devices described herein with each other, and with other devices. Communication subsystem 1000 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraph provides additional support for the claims of the subject application. One aspect provides a mobile computing device operated by a user, the mobile computing device comprising a housing having a first part and a second part, the first part including a first display, and the second part including a second display, the housing including at least one speaker mounted in the first part or the second part; and a processor mounted in the housing and operatively coupled to the speaker and first and second displays, the first display being configured to display a first graphical user interface element having an associated first audio stream; the second display being configured to display a second graphical user interface element having an associated second audio stream; at least one of the first and second displays being configured to display a first graphical user interface control configured to receive a user input of a volume balance setting to adjust a volume balance between a first application displayed on the first display and a second application displayed on the second display; at least one of the first and second displays being configured to display a second graphical user interface control configured to receive a user input of an overall volume setting to adjust an overall volume of the first audio stream and the second audio stream; and the processor being configured to play the first and second audio streams out of the speaker based on the volume balance setting and the overall volume setting. In this aspect, additionally or alternatively, the first graphical user interface control and second graphical user interface control may overlap when displayed. In this aspect, additionally or alternatively, the first graphical user interface control and second graphical user interface control may be configured to be actuated via a single continuous user input. In this aspect, additionally or alternatively, the first graphical user interface control may be a first slider control bar and the second graphical user interface control may be a second slider control bar. In this aspect, additionally or alternatively, the first slider control bar may be configured in parallel to the second slider control bar. In this aspect, additionally or alternatively, the first slider control bar may be configured perpendicularly to the second slider control bar. In this aspect, additionally or alternatively, the first graphical user interface control and the second graphical user interface control may be configured in nested, semicircular configurations. In this aspect, additionally or alternatively, at least one of the first graphical user interface control and the second graphical user interface control may be displayed partially on the first display and partially on the second display, and may be actuatable by a user input to either the first display or the second display. In this aspect, additionally or alternatively, the first part and the second part may be coupled by a hinge configured to permit the first and second displays to rotate between angular orientations from a face-to-face angular orientation to a back-to-back angular orientation; a hinge angle sensor may be mounted in the housing and configured to measure a relative angular displacement between the first and second parts of the housing; and the relative angular displacement may be the user input to control the first graphical user interface control or the second graphical user interface control. In this aspect, additionally or alternatively, the speaker may be a first speaker mounted in the first part of the housing, a second speaker being mounted in the second part of the housing; and the first and second audio streams may be respectively played out the first and second speakers, or the first and second audio streams may be respectively played out the second and first speakers, according to a program setting. In this aspect, additionally or alternatively, the user inputs for the volume balance setting and overall volume setting may be touch inputs on either the first or second touch-screen displays. In this aspect, additionally or alternatively, one of the first display and second display may be configured to display an audio mix control, the audio mix control being configured to receive a user input selecting between a parallel output mode in which the first audio stream from the first graphical user interface element displayed on the first display is played back via the first speaker positioned in the first part of the housing which houses the first display, and the second audio stream from the second graphical user interface element displayed on the second display is played back via the second speaker positioned in the second part of the housing which houses the second display, and a mixed output mode in which the associated audio streams from the graphical user interface elements displayed on both the first and second displays are mixed and output as mixed mono or stereo audio played back through both the first and second speakers.

Another aspect provides a computing device operated by a user, the computing device comprising a processor operatively coupled to at least a speaker and at least a display, the display being configured to display a first graphical user interface element having an associated first audio stream; the display being configured to display a second graphical user interface element having an associated second audio stream; the display being configured to display a first graphical user interface control configured to receive a user input of a volume balance setting to adjust a volume balance between a first application displayed on the display and a second application displayed on the display; the display being configured to display a second graphical user interface control configured to receive a user input of an overall volume setting to adjust an overall volume of the first audio stream and the second audio stream; and the processor being configured to play the first and second audio streams out of the speaker based on the volume balance setting and the overall volume setting. In this aspect, additionally or alternatively, the first graphical user interface control and second graphical user interface control may overlap when displayed. In this aspect, additionally or alternatively, the first graphical user interface control and second graphical user interface control may be configured to be actuated via a single continuous user input. In this aspect, additionally or alternatively, the first graphical user interface control may be a first slider control bar and the second graphical user interface control may be a second slider control bar. In this aspect, additionally or alternatively, the speaker may be a first speaker and a second speaker, the first and second audio streams being respectively played out the first and second speakers, or the first and second audio streams being respectively played out the second and first speakers, according to a program setting. In this aspect, additionally or alternatively, the user inputs for the volume balance setting and overall volume setting may be touch inputs on the display, which may be configured as a touch screen display. In this aspect, additionally or alternatively, the first graphical user interface control and the second graphical user interface control may be configured in nested, semicircular configurations.

Another aspect provides a mobile computing device operated by a user, the mobile device comprising a first display, a second display, at least one speaker; and a processor operatively coupled to the speaker and the first and second displays, the first display being configured to display a first graphical user interface element having an associated first audio stream; the second display being configured to display a second graphical user interface element; at least one of the first and second displays being configured to display a first graphical user interface control configured to receive a user input of a volume balance setting to adjust a volume balance between the foreground audio stream and one or a plurality of background audio streams; at least one of the first and second displays being configured to display a second graphical user interface control configured to receive a user input of an overall volume setting to adjust an overall volume of the foreground audio stream and the one or the plurality of background audio streams; and the processor being configured to play the foreground audio stream and the one or the plurality of background audio streams out of the speaker based on the volume balance setting and the overall volume setting.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A mobile computing device operated by a user, the mobile computing device comprising:
   a housing having a first part and a second part, the first part including a first display, and the second part including a second display, the housing including at least one speaker mounted in the first part or the second part; and
   a processor mounted in the housing and operatively coupled to the speaker and first and second displays, wherein
   the first display is configured to display a first graphical user interface element having an associated first audio stream;
   the second display is configured to display a second graphical user interface element having an associated second audio stream;
   at least one of the first and second displays is configured to display a first graphical user interface control configured to receive a user input of a volume balance setting to adjust a volume balance between a sound volume of a first application displayed on the first display and a sound volume of a second application displayed on the second display;
   at least one of the first and second displays is configured to display a second graphical user interface control configured to receive a user input of an overall volume setting to adjust an overall volume of the first audio stream and the second audio stream; and
   the processor is configured to play the first and second audio streams out of the speaker based on the volume balance setting and the overall volume setting;
   wherein the first graphical user interface control and the second graphical user interface control overlap when displayed;
   wherein the first graphical user interface control and the second graphical user interface control are configured to be actuated together via a single continuous user input.

2. The mobile computing device of claim 1, wherein the first graphical user interface control is a first slider control bar and the second graphical user interface control is a second slider control bar.

3. The mobile computing device of claim 2, wherein the first slider control bar is configured in parallel to the second slider control bar.

4. The mobile computing device of claim 2, wherein the first slider control bar is configured perpendicularly to the second slider control bar.

5. The mobile computing device of claim 1, wherein the first graphical user interface control and the second graphical user interface control are configured in nested, semicircular configurations.

6. The mobile computing device of claim 1, wherein at least one of the first graphical user interface control and the second graphical user interface control is displayed partially on the first display and partially on the second display, and is actuatable by a user input to either the first display or the second display.

7. The mobile computing device of claim 1, wherein the first part and the second part are coupled by a hinge configured to permit the first and second displays to rotate between angular orientations from a face-to-face angular orientation to a back-to-back angular orientation;
   a hinge angle sensor is mounted in the housing and configured to measure a relative angular displacement between the first and second parts of the housing; and
   the relative angular displacement is the user input to control the first graphical user interface control or the second graphical user interface control.

8. The mobile computing device of claim 1, wherein the speaker is a first speaker mounted in the first part of the housing and a second speaker mounted in the second part of the housing; and the first and second audio streams are respectively played out the first and second speakers, or the first and second audio streams are respectively played out the second and first speakers, according to a program setting.

9. The mobile computing device of claim 8, wherein
at least one of the first display and second display is configured to display an audio mix control, wherein the audio mix control is configured to receive a user input selecting between a parallel output mode in which the first audio stream from the first graphical user interface element displayed on the first display is played back via the first speaker positioned in the first part of the housing which houses the first display, and the second audio stream from the second graphical user interface element displayed on the second display is played back via the second speaker positioned in the second part of the housing which houses the second display, and a mixed output mode in which the associated audio streams from the graphical user interface elements displayed on both the first and second displays are mixed and output as mixed mono or stereo audio played back through both the first and second speakers.

10. The mobile computing device of claim 1, wherein
the user inputs for the volume balance setting and overall volume setting are touch inputs on either the first or second touch-screen displays.

11. A computing device operated by a user, the computing device comprising:
a processor operatively coupled to at least a speaker and at least a display, wherein
the display is configured to display a first graphical user interface element having an associated first audio stream;
the display is configured to display a second graphical user interface element having an associated second audio stream;
the display is configured to display a first graphical user interface control configured to receive a user input of a volume balance setting to adjust a volume balance between a sound volume of a first application displayed on the display and a sound volume of a second application displayed on the display;
the display is configured to display a second graphical user interface control configured to receive a user input of an overall volume setting to adjust an overall volume of the first audio stream and the second audio stream; and
the processor is configured to play the first and second audio streams out of the speaker based on the volume balance setting and the overall volume setting;
wherein the first graphical user interface control and the second graphical user interface control overlap when displayed;
wherein the first graphical user interface control and the second graphical user interface control are configured to be actuated together via a single continuous user input.

12. The computing device of claim 11, wherein the first graphical user interface control is a first slider control bar and the second graphical user interface control is a second slider control bar.

13. The computing device of claim 11, wherein
the speaker is a first speaker and a second speaker; and
the first and second audio streams are respectively played out the first and second speakers, or the first and second audio streams are respectively played out the second and first speakers, according to a program setting.

14. The computing device of claim 11, wherein
the user inputs for the volume balance setting and overall volume setting are touch inputs on the display, which is configured as a touch screen display.

15. The computing device of claim 11, wherein
the first graphical user interface control and the second graphical user interface control are configured in nested, semicircular configurations.

16. A mobile computing device operated by a user, the mobile computing device comprising:
a first display, a second display, at least one speaker; and a processor operatively coupled to the speaker and the first and second displays, wherein
the first display is configured to display a first graphical user interface element having an associated foreground audio stream;
the second display is configured to display a second graphical user interface element;
at least one of the first and second displays is configured to display a first graphical user interface control configured to receive a user input of a volume balance setting to adjust a volume balance between a sound volume of the foreground audio stream and a sound volume of one or a plurality of background audio streams;
at least one of the first and second displays is configured to display a second graphical user interface control configured to receive a user input of an overall volume setting to adjust an overall volume of the foreground audio stream and the one or the plurality of background audio streams; and
the processor is configured to play the foreground audio stream and the one or the plurality of background audio streams out of the speaker based on the volume balance setting and the overall volume setting;
wherein the first graphical user interface control and the second graphical user interface control overlap when displayed;
wherein the first graphical user interface control and the second graphical user interface control are configured to be actuated together via a single continuous user input.

* * * * *